Patented Nov. 29, 1927.

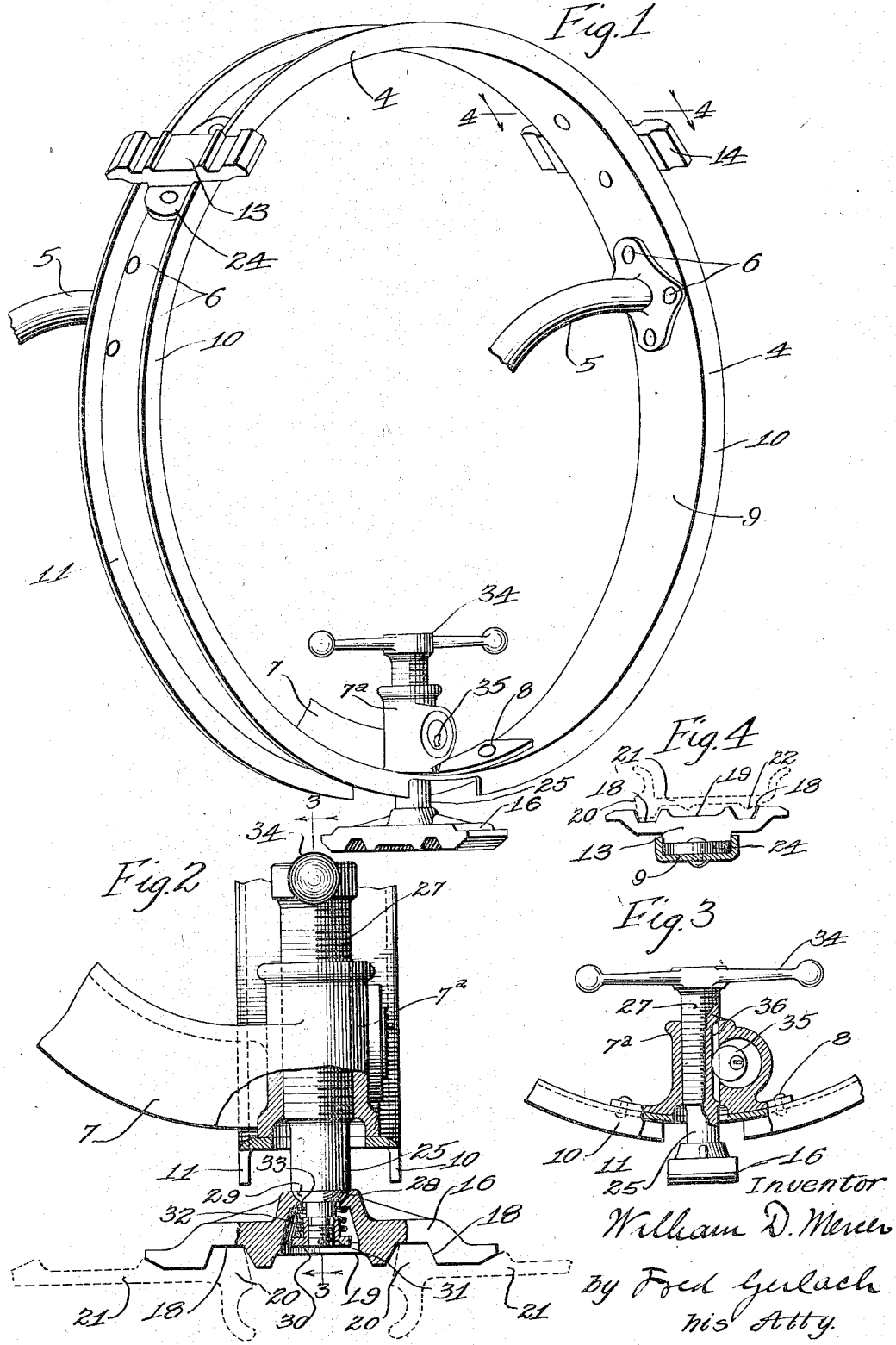

1,650,765

UNITED STATES PATENT OFFICE.

WILLIAM D. MERCER, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

SPARE-TIRE CARRIER FOR VEHICLES.

Application filed December 10, 1923. Serial No. 679,556.

The invention relates to spare tire carriers for vehicles and its object is to provide an improved carrier which comprises a flanged ring for supporting the brackets or lugs which engage the demountable rim or rims and in which the ring is formed to prevent buckling or distortion, which results from the inward radial pressure caused by the clamping pressure applied to the demountable rim.

The invention consists in the several novel features hereinafter set forth and more particularly defined by claims at the conclusion hereof.

In the drawings: Fig. 1 is a perspective of a carrier embodying the invention. Fig. 2 is a transverse section of the clamp for securing the demountable rim or rims on the carrier. Fig. 3 is a section taken on line 3—3 of Fig. 2. Fig. 4 is a section on line 4—4 of Fig. 1.

The invention is exemplified in a carrier comprising a ring 4 which is suitably supported from the body of the vehicle by side brackets 5 which are riveted, as at 6, to said ring and a lower bracket 7 which is riveted to the ring as at 8. This ring comprises a base 9 and front and rear outwardly extending flanges 10 and 11. Two bearing arms or members 13 and 14 are fixedly secured to the ring 4 and a clamping member 16 is adjustably connected to the bracket 7, so that the demountable rim or rims may be internally clamped and secured on the carrier. Each bearing-member 13 and 14 and the clamping member 16 are projected beyond both sides of the ring and are formed with a groove 18 adjacent either end and a central groove 19. The purpose of this formation is to make it possible to carry two demountable rims when desired, the internal flange 20 of one of the demountable rims 21 fitting in the grooves 18 adjacent one side of the bearing members and the corresponding flange of the second rim fitting in the grooves 18 adjacent the other side of the bearing members. These members are also adapted to retain a single rim, as shown by dotted lines in Fig. 4, the flange 20 of the rim fitting in one series of grooves 18 and the wedge-flange 22 of the rim fitting in the other series of grooves 18. Each of the bearing-members 13 and 14 is provided with lugs 24 fitting the base 9 of the ring circumferentially and fitting between the front and rear flanges 10 and 11 of the ring.

Clamping member 16 is swiveled on the lower end of a rod 25 which is adjustably held in a socket 7ª on bracket 7 by a screw-thread 27, so that by rotation of the rod, the clamp 16 may be raised or lowered. Clamp-member 16 is provided with a spherically concave surface 28 fitting on a correspondingly convex shoulder 29 adjacent the lower end of rod 25, to permit the clamping member to position itself between the demountable rims. Member 16 is held on the lower end of rod 25 by a sleeve 30 which is threaded to a screw 31 on the lower end of rod 25 and a spring 32 interposed between a flange on the lower end of the sleeve and a shoulder 33 on said member, so that it will be spring-pressed upwardly in engagement with the convex bearing shoulder 28 on the rod 25 and move upwardly with the rod while it is left free to tilt, so that the clamping member will be positioned to engage both rims with an equalized pressure, despite the commercial variation in the diameters of the rims. A suitable handle 34 is fixed to the upper end of rod 25, so that it may be turned to raise and lower the clamping member 16. If desired, a suitable key-controlled lock 35, adapted to enter a groove 36 in rod 25, may be used to lock the rod against rotation to prevent the theft of the rims from the carrier.

The invention exemplifies a carrier, in which the ring, on which the bearing-members are mounted, is provided with outwardly extending flanges at both sides and, as a result, the uneven stresses, tending to buckle or distort the ring, particularly when holding two rims, are effectively resisted, so that the ring will not be distorted in the brackets and, therefore, the squeaks and rattles, which result when the ring and bearing plates become distorted, are overcome. So far as I am aware, the rings used in the carriers of this type have not prevented the distortion referred to.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a spare tire carrier for a vehicle, the combination of a ring provided with a base and integral radial flanges at both sides of the base and extending outwardly therefrom, means for securing the ring to the vehicle, bearing members secured on the outer face of the base and between the flanges, said members being extended transversely to project over and outwardly of the flanges to support a demountable rim, and an adjustable clamping member for locking the rim on the bearing members.

2. In a spare tire carrier for a vehicle, the combination of a ring provided with a base and radial flanges at both sides of the base and extending outwardly therefrom, means for securing the ring to the vehicle, bearing members having lugs secured on the outer face of the base and extending between and abutting against the flanges, said members being extended transversely to project over and outwardly of the flanges to support a demountable rim, and an adjustable clamping member for locking the rim on the bearing members.

Signed at Detroit, Michigan, this 20th day of November, 1923.

WILLIAM D. MERCER.